United States Patent
Murakami et al.

(10) Patent No.: US 6,837,329 B2
(45) Date of Patent: Jan. 4, 2005

(54) POWER DISTRIBUTION CONTROL METHOD AND APPARATUS FOR FOUR-WHEEL DRIVE VEHICLE

(75) Inventors: Tsuyoshi Murakami, Kariya (JP); Ryohei Shigeta, Kariya (JP); Hisao Fumoto, Aki-gun (JP); Hideshi Hiruta, Aki-gun (JP); Masashi Oda, Aki-gun (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/401,582

(22) Filed: Mar. 31, 2003

(65) Prior Publication Data

US 2003/0201130 A1 Oct. 30, 2003

(30) Foreign Application Priority Data

Apr. 26, 2002 (JP) ........................................ 2002-126222

(51) Int. Cl.⁷ ............................................. B60K 17/344
(52) U.S. Cl. .......................... 180/247; 180/248; 701/89
(58) Field of Search ................................. 180/233, 247, 180/248, 249, 250; 701/89

(56) References Cited

U.S. PATENT DOCUMENTS 5,014,809 A * 5/1991 Matsuda ..................... 180/248
6,189,643 B1 * 2/2001 Takahashi et al. ........... 180/248
6,498,974 B1 * 12/2002 Rodrigues et al. ............ 701/69
6,549,840 B1 * 4/2003 Mikami et al. ................ 701/69

FOREIGN PATENT DOCUMENTS

JP 6-288415 10/1994

* cited by examiner

Primary Examiner—Kevin Hurley
(74) Attorney, Agent, or Firm—Oblon, Spivak, McClelland, Maier & Neustadt, P.C.

(57) ABSTRACT

A four-wheel drive vehicle has front wheels and rear wheels driven by an engine, and a coupling for changing the distribution ratio of torque to the front wheels and the rear wheels. An ECU determines whether engine braking is being applied based on the vehicle speed V and the throttle opening degree Od. When determining that engine braking is being applied, the ECU temporarily performs the engine braking related control. The ECU controls the engaging force of the coupling such that the distribution ratio of torque to the front wheels and the rear wheels is changed to a more equalized state in the engine braking related control than that before the engine braking related control is started. Accordingly, the fixing force of the front wheels and the rear wheels is temporarily increased without delay when engine braking is applied.

19 Claims, 2 Drawing Sheets

POWER DISTRIBUTION CONTROL METHOD AND APPARATUS FOR FOUR-WHEEL DRIVE VEHICLE

CROSS-REFERENCE TO RELATED APPLICATIONS

This application is based upon and claims the benefit of priority from prior Japanese Patent Application No. 2002-126222, filed on Apr. 26, 2002, the entire contents of which are incorporated herein by reference.

BACKGROUND OF THE INVENTION

The present invention relates to a power distribution control method and a power distribution control apparatus for a four-wheel drive vehicle.

Systems adopted in typical four-wheel drive vehicles include a part-time four-wheel drive system, in which four-wheel drive (4WD) and two-wheel drive (2WD) are switched, and a full-time four-wheel drive system, in which all four wheels are constantly driven. Generally, the part-time four-wheel drive system allows a driver to manually switch the driving mode to the four-wheel drive to directly couple the front and rear wheels. The full-time four-wheel drive system has a center differential between the front and rear wheels, which permits the front and rear wheels to travel at different rates to achieve permanent four-wheel drive.

In addition to the part-time and full-time four-wheel drive systems, a standby four-wheel drive system is known. The standby four-wheel drive system shifts the driving mode between the four-wheel drive and the two-wheel drive on demand. In the standby four-wheel drive system that includes front wheels as main drive wheels, a transaxle, which includes a transmission and a transfer, transmits torque of the engine to the front wheels by a pair of left and right front axles. The transaxle also transmits torque of the engine to a coupling through a propeller shaft. The coupling is coupled with a rear differential with a drive pinion shaft. The rear differential is coupled with rear wheels by a pair of left and right rear axles. The coupling adjusts the distribution ratio of torque transmitted to the front wheels and the rear wheels in accordance with, for example, the road condition and the driving condition.

Japanese Laid-Open Patent Publication 6-288415 discloses a mechanical coupling like the coupling described above. In a standby four-wheel drive system that includes the mechanical coupling, the relationship of the rotation speeds of the front and rear wheels is reversed when engine braking is applied while the vehicle is driven by two-wheel drive. After that, the vehicle shifts to be driven by four-wheel drive by the operation of the coupling, which increases the fixing force of the front and rear wheels.

The fixing force of the front and rear wheels is increased when engine braking is applied while the vehicle is traveling, which stabilizes the vehicle. In the standby four-wheel drive system that includes the mechanical coupling, however, the fixing force of the front and rear wheels is not increased until the relationship of the rotation speeds of the front and rear wheels is reversed even if engine braking is applied. This yields response performance.

Another coupling having a multiple disk hydraulic wet clutch that changes engaging force in accordance with the command from a controller. In the standby four-wheel drive system that includes the coupling, however, a special control is not performed in response to engine braking.

SUMMARY OF THE INVENTION

Accordingly, it is an objective of the present invention to provide a power distribution control method and a power distribution control apparatus for a four-wheel drive vehicle that temporarily increase the fixing force of the front and rear wheels without delay when engine braking is applied.

To achieve the above objective, the present invention provides a power distribution controlling method for a four-wheel drive vehicle. The vehicle has front wheels and rear wheels driven by torque supplied by an engine. The vehicle has a coupling for changing torque distribution to the front wheels and the rear wheels. The method includes controlling the coupling in accordance with a torque distribution mode selected from a normal mode and a secondary mode, determining whether engine braking is being applied, and temporarily changing the torque distribution mode from the normal mode to the secondary mode when it is determined that engine braking is being applied. The torque distribution to the front wheels and the rear wheels is more equalized in the secondary mode than that immediately before the torque distribution mode is changed to the secondary mode.

The present invention also provides a power distribution control apparatus for a four-wheel drive vehicle. The vehicle has front wheels and rear wheels driven by torque supplied by an engine. The vehicle has a coupling for changing torque distribution to the front wheels and the rear wheels. The apparatus includes a vehicle speed detecting device for detecting a speed of the vehicle, a throttle opening degree sensor for detecting a throttle opening degree, which is the opening degree of a throttle valve located in the engine, and a controller for controlling the coupling in accordance with a torque distribution mode selected from a normal mode and a secondary mode. The controller determines whether engine braking is being applied based on the detected vehicle speed and the detected throttle opening degree. When determining that engine braking is being applied, the controller temporarily changes the torque distribution mode from the normal mode to the secondary mode. The torque distribution to the front wheels and the rear wheels is more equalized in the secondary mode than that immediately before the torque distribution mode is changed to the secondary mode.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A four-wheel drive vehicle 11 that includes front wheels as main drive wheels according to a preferred embodiment of a power distribution control apparatus of the present invention will now be described with reference to FIGS. 1 and 2.

Figure 1:
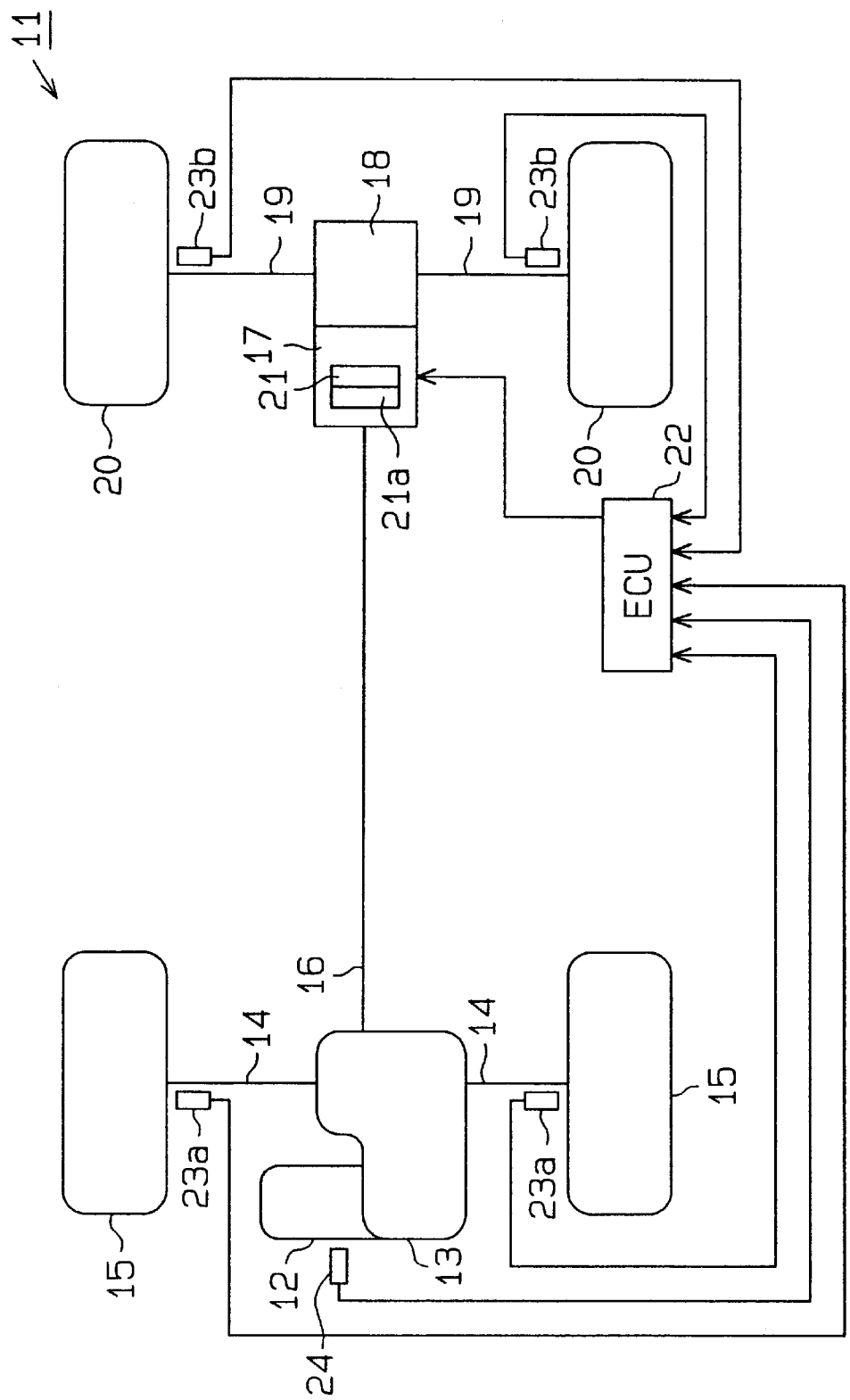
FIG. 1 is a schematic diagram illustrating a four-wheel drive vehicle according to a preferred embodiment of the present invention.

As shown in FIG. 1, the four-wheel drive vehicle 11 has an internal combustion engine, which is an engine 12 in this embodiment, and a transaxle 13. The transaxle 13 includes, for example, a transmission, a front differential and a transfer (none of which are shown). The transaxle 13 is coupled with a pair of front axles 14. The front axles 14 are coupled with front wheels 15. Power of the engine 12 is transmitted to the front wheels 15 by the transaxle 13 and the front axles 14.

The transaxle 13 is coupled with a propeller shaft 16. The propeller shaft 16 is coupled with a power transmitting device, which is a coupling 17. The coupling 17 is coupled with a rear differential 18 with a drive pinion shaft (not shown). The rear differential 18 is coupled with rear wheels 20 by a pair of rear axles 19. When the propeller shaft 16 is coupled with the drive pinion shaft by the coupling 17 to transmit the torque, the power of the engine 12 is transmitted to the rear wheels 20 by the propeller shaft 16, the drive pinion shaft, the rear differential 18 and the rear axles 19. In the preferred embodiment, the front wheels 15 are main drive wheels that are coupled to the engine 12 without the coupling 17. The rear wheels 20 are sub drive wheels that are coupled to the engine 12 by the coupling 17.

The coupling 17 includes an electromagnetic clutch mechanism 21, which is a multiple disk hydraulic wet clutch. The electromagnetic clutch mechanism 21 has clutch plates (not shown), which are selectively engaged by friction and separate from each other, and a electromagnetic coil 21a. An amount of current is supplied to the electromagnetic coil 21a in accordance with a control signal (current command value) from an electronic control unit (hereinafter, referred to as an ECU). The ECU 22 will be described later. The degree of frictional engagement of each clutch plate varies in accordance with the amount of current supplied to the electromagnetic coil 21a and power (torque) of the propeller shaft 16 is transmitted to the drive pinion shaft.

The torque transmitted from the propeller shaft 16 to the drive pinion shaft is determined in accordance with the degree of frictional engagement of each clutch plate and increases as the degree of frictional engagement increase. The degree of frictional engagement of each clutch plate varies in accordance with the amount of current supplied to the electromagnetic coil 21a. Accordingly, the fixing force of the front wheels 15 and rear wheels 20, that is, the distribution ratio of torque is adjusted.

In the two-wheel drive mode, no current is supplied to the electromagnetic coil 21a, which stops the transmission of torque of the electromagnetic clutch mechanism 21. Accordingly, the distribution ratio of torque of the front wheels 15 to the rear wheels 20 is 100:0. When current supply is increased and the clutch plates of the electromagnetic clutch mechanism 21 entirely engage each other, that is, the electromagnetic clutch mechanism 21 is directly coupled, the distribution ratio of torque of the front wheels 15 to the rear wheels 20 is 50:50 while the four wheels are not slipping. The coupling 17 varies the distribution ratio of torque transmitted to the front wheels 15 and the rear wheels 20 by the command from the ECU 22 within the range of 100:0–50:50. Specifically, the coupling 17 is operated in the four-wheel drive mode or the two-wheel drive mode by changing the engaging force of the clutch plates. In the four-wheel drive mode, the coupling 17 varies the distribution ratio of torque transmitted to the front wheels 15 and the rear wheels 20.

The ECU 22 is mainly formed of a microcomputer, which includes, for example, a CPU, a RAM, a ROM, and an I/O interface (none of which are shown). The ROM stores several control programs that are executed by the ECU 22 and several types of data and maps. The maps are obtained by, for example, experimental data of a vehicular model and conventional theoretical calculations. The RAM is a working area where the CPU of the ECU 22 deploys the control programs stored in the ROM and executes several computing processes.

The ECU 22 is connected to two front wheel speed sensors 23a, which correspond to the front wheels 15, two rear wheel speed sensors 23b, which correspond to the rear wheels 20, and a throttle opening degree sensor 24 via the I/O interface. The ECU 22 is also connected to the coupling 17 and an engine control device (not shown) via the I/O interface.

The front wheel speed sensors 23a detect the rotational speed of the corresponding front wheels 15. The rear wheel speed sensors 23b detect the rotational speed of the corresponding rear wheels 20. The throttle opening degree sensor 24 is connected to a throttle valve (not shown) of the vehicle engine and detects the opening degree of the throttle valve (throttle opening degree Od). The throttle opening degree Od reflects the depression amount of an acceleration pedal (not shown) of the vehicle.

The ECU 22 computes the vehicle speed V based on the detection signals from the wheel speed sensors 23a, 23b. The ECU 22 computes the throttle opening degree Od based on the detection signals from the throttle opening degree sensor 24. The ECU 22 determines whether engine braking is being applied based on the vehicle speed V and the throttle opening degree Od.

The ECU 22 controls the coupling 17 in accordance with a torque distribution mode selected from a normal mode and a secondary mode. When determining that engine braking is not being applied, the ECU 22 controls the coupling 17 in accordance with the normal mode (including the two-wheel drive mode and the four-wheel drive mode). When determining that engine braking is being applied, the ECU 22 temporarily changes the torque distribution mode from the normal mode to the secondary mode. The secondary mode is a torque distribution mode executed in response to application of engine braking, and will hereinafter be referred to as engine braking related control mode. In the engine braking related control mode, the coupling 17 is controlled such that the distribution ratio of torque (distribution ratio of power) to the front wheels 15 and the rear wheels 20 is changed to a more equalized state than that immediately before the engine braking related control mode is started. Specifically, in the engine braking related control mode, the coupling 17 is controlled such that the distribution ratio of torque to the rear wheels 20, which are the sub drive wheels, is greater than that before the engine braking related control is started. The changing amount between the distribution ratio of torque before the start of the engine braking related control and that after the start of the engine braking related control is determined based on the data stored in the ROM as a map, which corresponds to the driving condition of the vehicle.

The control program stored in the ROM includes control program for the two-wheel drive mode and the four-wheel drive mode. In the four-wheel drive mode, the engaging force of the coupling 17 is controlled in accordance with the driving condition of the vehicle such that the distribution ratio of torque to the front wheels 15 and the rear wheels 20 is adjusted. The ROM stores the data for calculating the amount of current supplied to the electromagnetic coil 21a in accordance with the driving condition of the vehicle as a map. The engaging force of the coupling 17, that is, the distribution ratio of torque to the front wheels 15 and the rear wheels 20 is determined by the amount of current supplied to the electromagnetic coil 21a. In the preferred embodiment, the driving condition of the vehicle includes the difference ΔN between the average rotational speed of the front wheels 15 and the average rotational speed of the rear wheels 20 (hereinafter, referred to as the wheel speed difference ΔN), the throttle opening degree Od and the vehicle speed V. The map is set such that the distribution ratio of torque to the front and rear wheels 15, 20 is changed to a more equalized state (that is, the distribution ratio of torque to the rear wheels 20 is greater) when the vehicle is accelerated than when the vehicle is in a steady driving state.

Even if it is continuously determined that engine braking is being applied, the ECU 22 controls the coupling 17 according to a first return procedure so that the torque distribution mode of the coupling 17 is returned from the engine braking related mode to the normal mode in a case when a predetermined time period elapses after the engine braking related control mode is started. Specifically, the ECU 22 controls the coupling 17 in accordance with the first return procedure such that the distribution ratio of torque to the front and rear wheels 15, 20 returns to the ratio before the engine braking related control is started.

The ECU 22 also controls the coupling 17 in accordance with a second return procedure so that the torque distribution mode of the coupling 17 is returned to the normal mode from the engine braking related control mode in a case when the throttle opening degree Od is greater or equal to a predetermined threshold value after the engine braking related control is started. The ECU 22 controls the coupling 17 such that the distribution ratio of torque returns to the ratio before the engine braking related control is started more rapidly in the second return procedure than that in the first return procedure.

Figure 2:
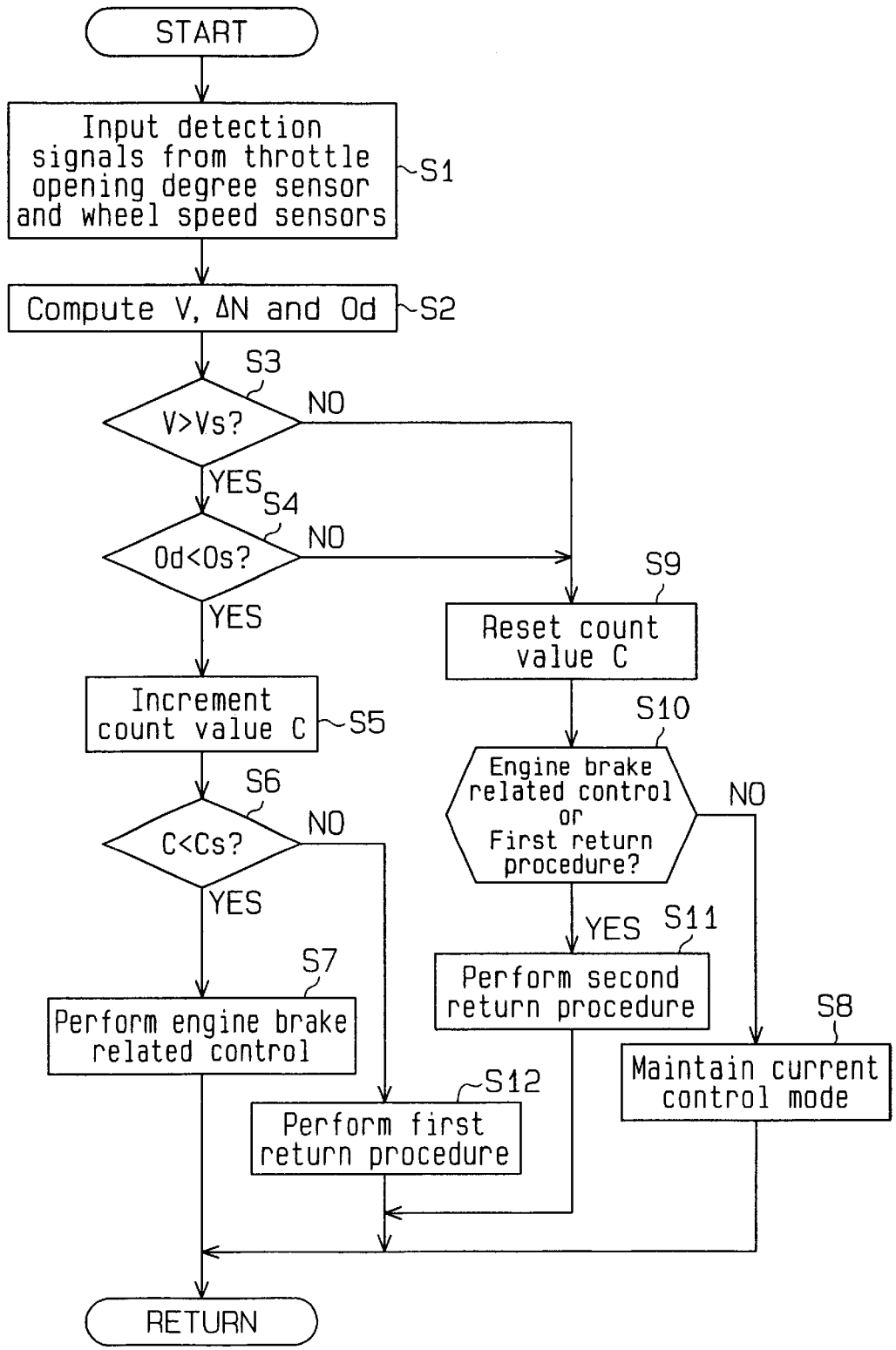
FIG. 2 is a flowchart showing a control procedure executed by an ECU that is mounted on the four-wheel vehicle in FIG. 1.

FIG. 2 is a flowchart showing the control procedure performed by the ECU 22. The routine shown in FIG. 2 is executed every predetermined control cycle.

In step S1, the ECU 22 inputs the detection signals from the throttle opening degree sensor 24 and the wheel speed sensors 23a, 23b. In step S2, the ECU 22 computes the vehicle speed V, the wheel speed difference ΔN and the throttle opening degree Od based on the detection signals. The vehicle speed V is obtained by computing the average rotational speed of the rear wheels 20, which are the sub drive wheels and have small amount of wheel slip. The wheel speed difference ΔN is obtained from the difference between the average rotational speed of the front wheels 15 and the average rotational speed of the rear wheels 20. The throttle opening degree Od is obtained from the detection signal from the throttle opening degree sensor 24.

In step S3, the ECU 22 determines whether the vehicle speed V is greater than a predetermined low speed threshold value Vs. When the vehicle speed V is greater than the low speed threshold value Vs, the ECU 22 proceeds to S4 and determines whether the throttle opening degree Od is less than a predetermined threshold value Os. When the throttle opening degree Od is less than the threshold value Os, the ECU 22 determines that engine braking being applied and proceeds to step S5. The determination processes of steps S3 and S4 correspond to the processes in which the ECU 22 determines whether engine braking is being applied. The threshold value Os concerning the throttle opening degree Od is a relatively small value and is, for example, the value corresponding to the throttle opening degree Od when the depression amount of the acceleration pedal is zero or approximately zero.

In step S5, the ECU 22 increments the count value C of the engine braking related control counter in the ECU 22 by one and proceeds to step S6. When it is continuously determined that engine braking is being, the count value C is incremented by one every time the routine in FIG. 2 is performed. In step S6, the ECU 22 determines whether the count value C is less than a predetermined threshold value Cs. When the count value C is less than the threshold value Cs, the ECU 22 proceeds to step S7 and performs the engine braking related control. The count value C represents the elapsed time period since engine braking is started, that is, the elapsed time period since the engine braking related control is started. The ECU 22 recognizes the elapsed time period since the engine braking related control is started with reference to the count value C. Accordingly, the engine braking related control counter plays a part of a timer that keeps the elapsed time period since the engine braking related control is started.

In step S7, the ECU 22 performs the engine braking related control. Specifically, the ECU 22 controls the coupling 17 such that the distribution ratio of torque transmitted to the front wheels 15 and the rear wheels 20 is changed to a more equalized state than that before the engine braking related control is started. In other words, the ECU 22 controls the coupling 17 such that the distribution ratio of torque to the rear wheels 20, which are the sub drive wheels, is greater than that before the engine braking related control is started. Accordingly, the fixing force of the front and rear wheels 15, 20 is temporarily increased soon after engine braking starts being applied.

When it is determined that the vehicle speed V is less than or equal to the low speed threshold value Vs in step S3, the ECU 22 proceeds to step S9. When it is determined that the throttle opening degree Od is greater than or equal to the threshold value Os in step S4, the ECU 22 determines that engine braking is not being applied and proceeds to step S9. In step S9, the ECU 22 resets the count value C and proceeds to step S10.

In step S10, the ECU 22 determines whether the engine braking related control or the first return procedure is performed. When the engine braking related control and the first return procedure are not performed, the ECU 22 proceeds to step S8 and maintains the current control mode. While, either of the engine braking related control or the first return procedure is performed, the ECU 22 proceeds to step S11 and performs the second return procedure. In the second return procedure, the coupling 17 is controlled such that the distribution ratio of torque transmitted to the front wheels 15 and the rear wheels 20 returns relatively rapidly to the ratio before the engine braking related control is started, which is described above.

When the count value C is greater than or equal to the threshold value Cs in step S6, the ECU 22 proceeds to step S12 and performs the first return procedure. In the first return procedure, the coupling 17 is controlled such that the distribution ratio of torque transmitted to the front wheels 15 and the rear wheels 20 returns relatively slowly to the ratio before the engine braking related control is started, which is described above.

When the count value C is greater than or equal to the threshold value Cs, enough time has elapsed since the engine braking related control is started and the application of engine braking does not infect the drive of the vehicle.

Accordingly, the torque distribution mode of the coupling 17 is returned to the normal mode from the engine braking related control mode since there is no necessary to perform the engine braking related control. The control mode returns slowly to the former mode in accordance with the first return procedure since the motion of the vehicle becomes unstable if the control mode is returned to the normal mode rapidly while engine braking is applied.

The preferred embodiment has the following advantages.

The engine braking related control is temporarily performed when engine braking is applied while it is determined that engine braking is applied. In the engine braking related control, the ECU 22 controls the coupling 17 such that the distribution ratio of torque to the front wheels 15 and the rear wheels 20 is changed to a more equalized state than that before the engine braking related control is started. Accordingly, the fixing force of the front wheels 15 and the rear wheels 20 is temporarily increased soon after engine braking is applied. Therefore, the stability of the vehicle is improved when engine braking is applied.

It is determined whether engine braking is being applied based on the vehicle speed V and the throttle opening degree Od. Specifically, it is determined that engine braking is being applied when the vehicle speed V is greater than the low speed threshold value Vs and the throttle opening degree Od is less than the threshold value Os. Accordingly, it is easily and accurately determined that engine braking is being applied.

In a case when it is continuously determined that engine braking is being applied, the distribution ratio of torque to the front wheels 15 and the rear wheels 20 returns to the ratio before the engine braking related control is started when the predetermined time period elapses since the engine braking related control is started. That is, the torque distribution mode of the coupling 17 is returned to the normal mode from the engine braking related control mode when the predetermined time period elapses since the engine braking related control is started. Accordingly, it is prevented that the engine braking related control is unnecessarily continued.

The torque distribution mode of the coupling 17 is returned to the normal mode from the engine braking related control mode when the throttle opening degree Od is greater than or equal to the threshold value Os while the engine braking related control is performed. Specifically, the engine braking related control is interrupted and the control mode is returned to the former mode rapidly in a case when the acceleration pedal is depressed and engine braking is not applied.

When the torque distribution mode of the coupling 17 is returned from the engine braking related control mode to the normal mode, the return speed of the control mode varies in accordance with whether engine braking is currently being applied or not. Specifically, when engine braking is not being applied, the torque distribution mode is returned to the former mode rapidly as compared to when engine braking is being applied. Therefore, the torque distribution mode is returned to the former mode properly and smoothly in accordance with the current driving condition of the vehicle without infecting the motion of the vehicle.

The preferred embodiment may be modified as follows.

The process of step S3 shown in FIG. 2 may be omitted. In this case, the engine braking related control may be performed when the vehicle speed V is less than or equal to the low speed threshold value Vs. However, the vehicle is not infected when the engine braking related control is performed while the vehicle speed V is low.

The return speed of the control mode may be constant irrespective of whether engine braking is being applied or not. Specifically, the return procedure of the control mode may always be the same irrespective of whether engine braking is being applied or not. In this case, the control for performing the return procedure of the torque distribution mode is simplified.

In the preferred embodiment, the standby four-wheel drive system is adopted. However, the invention may not be restricted to the system but to a four-wheel drive system having a center differential that includes an electronically controlled multiple disk. In the four-wheel drive system, the distribution ratio of torque to the front wheels and the rear wheels varies within the range from a predetermined ratio that is determined by the center differential to the ratio of 50:50, or the multiple disk entirely engages. In the four-wheel drive system, all four wheels are constantly driven.

The changing amount (or changing ratio) between the distribution ratio of torque before the start of the engine braking related control and that after the start of the engine braking related control may be constant irrespective of the driving condition of the vehicle.

The invention may not restrictively adopted to the four-wheel drive vehicle in which the front wheels 15 are the main wheels but to a four-wheel drive vehicle in which the rear wheels 20 are the main drive wheels. In this case, the front wheels 15 are coupled to the engine 12 by the coupling 17.

It may be determined whether engine braking is being applied in accordance with the operation amount (depression amount) of an acceleration pedal instead of the throttle opening degree Od. In this case, a pedal depression sensor is mounted for detecting the depression amount of the acceleration pedal and it is determined whether engine braking is applied based on the detection signal from the pedal depression sensor.

The throttle opening degree Od reflects the depression amount of the acceleration pedal. Accordingly, the throttle opening degree Od may be computed based on the detection signal from the pedal depression sensor and it may be determined whether engine braking is applied or not based on the computed throttle opening degree Od. That is, in the specification, the detection of the throttle opening degree Od means to detect other parameters concerning the throttle opening degree Od or to compute the throttle opening degree Od from the parameters as well as directly detect the throttle opening degree Od.

In the illustrated embodiment, the duration of the engine braking related control is measured with the counter. Instead, the duration may be directly measured with a timer, and the torque distribution mode of the coupling 17 may be returned from the engine braking related control mode to the normal mode when the measured duration reaches a predetermined value.

The threshold value Cs concerning the count value C, that is, the threshold value Cs indicating the acceptable duration of the engine braking related control may be varied in accordance with the vehicle speed V at the starting time of the engine braking related control.

The process of step S9 in FIG. 2, or the reset process of the count value C, may be omitted from the flowchart of FIG. 2 and executed independent from the flowchart. In this case, for example, a sensor for detecting the depression of the acceleration pedal may be located and the count value C may be reset based on the depression detection signal from the sensor.

The electromagnetic clutch mechanism 21 embedded in the coupling 17 may be modified to a hydraulic clutch mechanism that is operated by hydraulic pressure.

In the preferred embodiment, the vehicle speed V is computed based on the average rotational speed of the rear wheels 20. Instead, a speed sensor may be located as a speed detection device and the vehicle speed V may be directly detected. Otherwise, an acceleration sensor may be used as the speed detection device.

Therefore, the present examples and embodiments are to be considered as illustrative and not restrictive and the invention is not to be limited to the details given herein, but may be modified within the scope and equivalence of the appended claims.

What is claimed is:

1. A power distribution controlling method for a four-wheel drive vehicle, wherein the vehicle has front wheels and rear wheels driven by torque supplied by an engine, wherein the vehicle has a coupling for changing torque distribution to the front wheels and the rear wheels, the method comprising:

controlling the coupling in accordance with a torque distribution mode selected from a normal mode and a secondary mode;

determining whether engine braking is being applied;

temporarily changing the torque distribution mode from the normal mode to the secondary mode when it is determined that engine braking is being applied, wherein the torque distribution to the front wheels and the rear wheels is more equalized in the secondary mode than that immediately before the torque distribution mode is changed to the secondary mode;

detecting a speed of the vehicle; and detecting a throttle opening degree, which is the opening degree of a throttle valve located in the engine, wherein the detected vehicle speed and the detected throttle opening degree are used to determine whether engine braking is being applied.

2. The method according to claim 1, wherein it is determined that engine braking is being applied when the vehicle speed is greater than a predetermined low speed threshold value and the throttle opening degree is less than a predetermined opening degree threshold value.

3. The method according to claim 2, further comprising returning the torque distribution mode from the secondary mode to the normal mode when the throttle opening degree is greater than or equal to the opening degree threshold value while the torque distribution mode is the secondary mode.

4. The method according to claim 2, further comprising returning the torque distribution mode from the secondary mode to the normal mode when the throttle opening degree remains less than the opening degree threshold value for a predetermined time period after the torque distribution mode is changed to the secondary mode.

5. The method according to claim 1, further comprising returning the torque distribution mode from the secondary mode to the normal mode when it is determined that engine braking is being applied continuously for a predetermined time period after the torque distribution mode is changed to the secondary mode.

6. The method according to claim 1, further comprising returning the torque distribution mode from the secondary mode to the normal mode when it is determined that a predetermined condition is met after the torque distribution mode is changed to the secondary mode, wherein, when the torque distribution mode is returned to the normal mode, the speed at which the torque distribution mode is returned varies depending upon whether or not engine breaking is being applied while the distribution mode is being returned.

7. The method according to claim 6, wherein the returning speed of the distribution mode from the secondary mode to the normal mode is faster in the case when engine breaking is not being applied as compared to the case when engine breaking is being applied.

8. The method according to claim 2, further comprising: returning the torque distribution mode from the secondary mode to the normal mode in accordance with a first return procedure when the throttle opening degree remains less than the opening degree threshold value for a predetermined time period after the torque distribution mode is changed to the secondary mode; and returning the torque distribution mode from the secondary mode to the normal mode in accordance with a second return procedure when the throttle opening degree is greater than or equal to the opening degree threshold value before the predetermined time period elapses since the torque distribution mode is changed to the secondary mode, wherein the returning speed of the distribution mode from the secondary mode to the normal mode is faster in the second return procedure than in the first return procedure.

9. A power distribution control apparatus for a four-wheel drive vehicle, wherein the vehicle has front wheels and rear wheels driven by torque supplied by an engine, wherein the vehicle has a coupling for changing torque distribution to the front wheels and the rear wheels, the apparatus comprising: a vehicle speed detecting device for detecting a speed of the vehicle; a throttle opening degree sensor for detecting a throttle opening degree, which is the opening degree of a throttle valve located in the engine; and a controller for controlling the coupling in accordance with a torque distribution mode selected from a normal mode and a secondary mode, wherein the controller determines whether engine braking is being applied based on the detected vehicle speed and the detected throttle opening degree, wherein, when determining that engine braking is being applied, the controller temporarily changes the torque distribution mode from the normal mode to the secondary mode, wherein the torque distribution to the front wheels and the rear wheels is more equalized in the secondary mode than that immediately before the torque distribution mode is changed to the secondary mode.

10. The apparatus according to claim 9, wherein either the front wheels or the rear wheels are main drive wheels that are coupled to the engine without the coupling, and the wheels that are not the main drive wheels are sub drive wheels that are coupled to the engine by the coupling.

11. The apparatus according to claim 10, wherein the controller controls the coupling such that, in the secondary mode, the torque distribution to the sub drive wheels is greater than that immediately before the torque distribution mode is changed to the secondary mode.

12. The apparatus according to claim 9, wherein, when determining that engine braking is being applied continuously for a predetermined time period after the torque distribution mode is changed to the secondary mode, the controller controls the coupling to return the torque distribution to the front wheels and the rear wheels to the state immediately before the torque distribution mode is changed to the secondary mode.

13. The apparatus according to claim 9, wherein, when determining that engine braking is being applied continuously for a predetermined time period after the torque distribution mode is changed to the secondary mode, the controller returns the torque distribution mode from the secondary mode to the normal mode.

14. The apparatus according to claim 9, wherein the controller determines that engine braking is being applied when the vehicle speed is greater than a predetermined low speed threshold value and the throttle opening degree is less than a predetermined opening degree threshold value.

15. The apparatus according to claim 14, wherein, when the throttle opening degree is greater than or equal to the opening degree threshold value while the torque distribution mode is the secondary mode, the controller controls the coupling to return the torque distribution to the front wheels and the rear wheels to the state immediately before the torque distribution mode is changed to the secondary mode.

16. The apparatus according to claim 14, wherein, when the throttle opening degree is greater than or equal to the opening degree threshold value while the torque distribution mode is the secondary mode, the controller returns the torque distribution mode from the secondary mode to the normal mode.

17. The apparatus according to claim 9, wherein, when determining that a predetermined condition is met after the torque distribution mode is changed to the secondary mode, the controller returns the torque distribution mode from the secondary mode to the normal mode at a speed that varies depending upon whether or not engine breaking is being applied during while the distribution mode is being returned.

18. The apparatus according to claim 17, wherein the returning speed of the distribution mode from the secondary mode to the normal mode is faster in the case when engine breaking is not being applied as compared to the case when engine breaking is being applied.

19. The apparatus according to claim 14, wherein the controller returns the torque distribution mode from the secondary mode to the normal mode in accordance with a first return procedure when the throttle opening degree remains less than the opening degree threshold value for a predetermined time period after the torque distribution mode is changed to the secondary mode, wherein the controller returns the torque distribution mode from the secondary mode to the normal mode in accordance with a second return procedure when the throttle opening degree is greater than or equal to the opening degree threshold value before the predetermined time period elapses since the torque distribution mode is changed to the secondary mode, and wherein the controller returns the torque distribution mode faster in the second return procedure than in the first return procedure.

* * * * *